(12) United States Patent
Godley

(10) Patent No.: US 9,311,762 B2
(45) Date of Patent: Apr. 12, 2016

(54) VEHICLE CONTROL SYSTEM

(71) Applicant: Matthew Howard Godley, Davidson, NC (US)

(72) Inventor: Matthew Howard Godley, Davidson, NC (US)

( * ) Notice: Subject to any disclaimer, the term of this patent is extended or adjusted under 35 U.S.C. 154(b) by 0 days.

(21) Appl. No.: 14/455,232

(22) Filed: Aug. 8, 2014

(65) Prior Publication Data

US 2015/0198948 A1 Jul. 16, 2015

Related U.S. Application Data

(60) Provisional application No. 61/927,692, filed on Jan. 15, 2014.

(51) Int. Cl.
| | |
|---|---|
| *G07C 5/00* | (2006.01) |
| *G05D 1/00* | (2006.01) |
| *B60W 30/00* | (2006.01) |
| *G07C 5/08* | (2006.01) |
| *B60W 30/14* | (2006.01) |
| *B60W 50/00* | (2006.01) |

(52) U.S. Cl.
CPC ........... *G07C 5/0841* (2013.01); *B60W 30/143* (2013.01); *G05D 1/0011* (2013.01); *G07C 5/008* (2013.01); *B60W 2050/0045* (2013.01); *B60W 2050/0077* (2013.01); *B60W 2550/20* (2013.01); *G05D 2201/0213* (2013.01)

(58) Field of Classification Search
USPC ........ 701/2, 29.1, 31.4, 31.5, 33.2, 33.4, 412; 702/127, 141–142, 182–183
See application file for complete search history.

(56) References Cited

U.S. PATENT DOCUMENTS

| | | | | |
|---|---|---|---|---|
| 8,933,776 | B2 * | 1/2015 | Dua et al. ........................ | 340/5.2 |
| 2003/0203717 | A1 * | 10/2003 | Chuprun et al. ............. | 455/12.1 |
| 2006/0149519 | A1 * | 7/2006 | Keller ............................... | 703/8 |
| 2008/0252487 | A1 * | 10/2008 | McClellan et al. ........... | 340/936 |
| 2009/0243883 | A1 * | 10/2009 | Simon ........................... | 340/905 |
| 2010/0207751 | A1 * | 8/2010 | Follmer et al. ................ | 340/439 |
| 2011/0032093 | A1 * | 2/2011 | Miller et al. ................... | 340/441 |
| 2011/0093161 | A1 * | 4/2011 | Zhou et al. ...................... | 701/33 |
| 2011/0130916 | A1 * | 6/2011 | Mayer ............................. | 701/33 |
| 2013/0085655 | A1 * | 4/2013 | Kii et al. ....................... | 701/103 |

* cited by examiner

*Primary Examiner* — Yonel Beaulieu
(74) *Attorney, Agent, or Firm* — William M. Hobby, III

(57) ABSTRACT

The present invention relates to a mobile communication system having a safe driving system central micro-processor which interfaces with a vehicle's controller area network or CAN BUS network and communicates between multiple transceiver micro controllers and their respective and discrete modules to remotely monitor a vehicle's operation and remotely execute commands to the vehicle.

18 Claims, 4 Drawing Sheets

VEHICLE CONTROL SYSTEM

This application claims the benefit of U.S. Provisional Application No. 61/927,692, filed Jan. 15, 2014.

The present invention relates to a mobile communication system which has a safe driving system micro-processor which interfaces with a vehicle's controller area network (CAN BUS) and communicates between multiple transceiver micro controllers and their respective and discrete modules to remotely monitor a vehicle's operation and remotely execute commands to the vehicle.

BACKGROUND OF THE INVENTION

The present invention couples to a Controller Area Network or CAN BUS which is a vehicle Bus standard designed to allow micro-controllers and devices to communicate with each other within a vehicle without a host computer. A CAN bus is a message based protocol designed specifically for automotive applications. CAN bus is the protocol used in the on-board vehicle diagnostics (OBD-II or any later version) standard of modern vehicles. The OBD-II standard has been mandatory for all cars and light trucks in the United States since 1996. CAN bus is a multi-master broadcast serial bus standard for connecting electronic control units (ECUs). A CAN network typically connects sensors, actuators and other control devices, which devices are connected through a host processor and a CAN controller. Each node of the bus requires a host processor and each may have sensors, actuators and control devices connected thereto and a CAN controller for receiving and sending bits serially to and from the bus and a transceiver. The present invention connects to the CAN bus through an OBD interface and is adapted to attach to the OBD on existing vehicles or to be incorporated into new vehicles and provides mobile communications between multiple transceiver micro controllers and discrete modules. Each module, such as the audio-video, speed, GPS, G-meter, cellular, blue tooth, tolerance memory, and breathalyser, are on the same CAN bus communicating in real time by way of integrated transceivers assigned to each module on the CAN bus. CAN bus is a multi-master serial bus standard for connecting electronic control units (ECU) for various systems. Typically electronic control units include the electronic control unit, the transmission, doors, mirror adjustment, battery and recharging and may need to control actuators and receive feedback from vehicle sensors.

SUMMARY OF THE INVENTION

The present invention is for a vehicle control system for monitoring and executing a control command remotely in a vehicle having a CAN BUS communications network. A safe driving system central microprocessor mates a plurality of modules or nodes to the CAN BUS communication network. The plurality of modules includes a Global Position System and an accelerometer, and a speed limit determining module for determining the speed limit at the location of the vehicle and a tolerance comparator module for determining a speed limit tolerance. A transceiver can communicate data from a plurality of the modules. The system includes a remote wireless communication device for receiving data transmitted from the transceiver and has a wireless communication device having an applet for remotely executing a control command to the vehicle CAN BUS network limiting the operation of the vehicle responsive to data received from the plurality of data modules. A vehicle's operation is thus remotely monitored and control commands can be executed remotely from a wireless communication device.

BRIEF DESCRIPTION OF THE DRAWINGS

The accompanying drawings, which are included to provide further understanding of the invention and are incorporated in and constitute a part of the specification, illustrate an embodiment of the invention and, together with the description, serve to explain the principles of the invention.

In the drawings.

DETAILED DESCRIPTION OF EXEMPLARY EMBODIMENT

Figure 1:
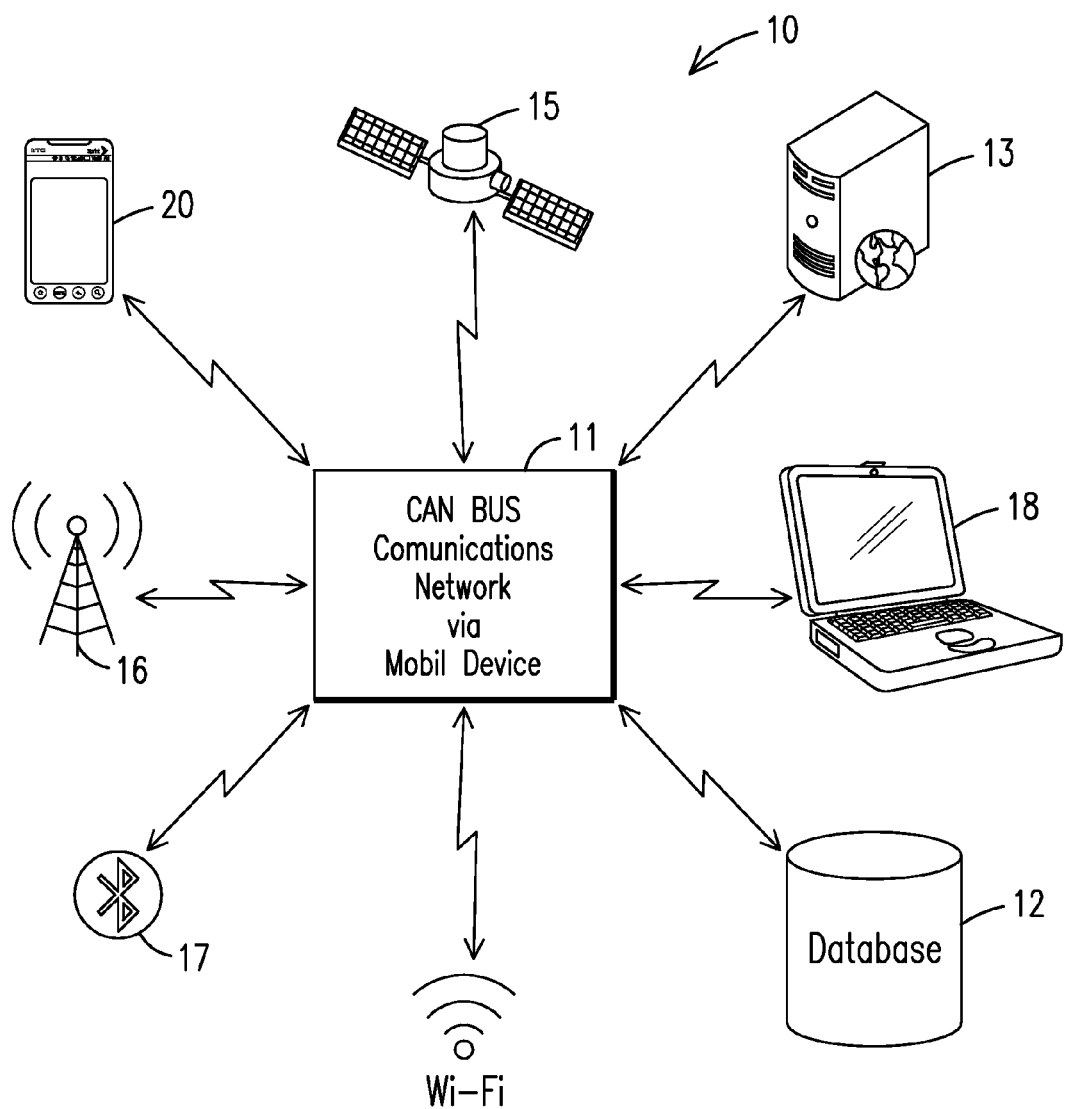
FIG. 1 is a broad overview diagram of a communications network in accordance with the present invention.
Figure 2:
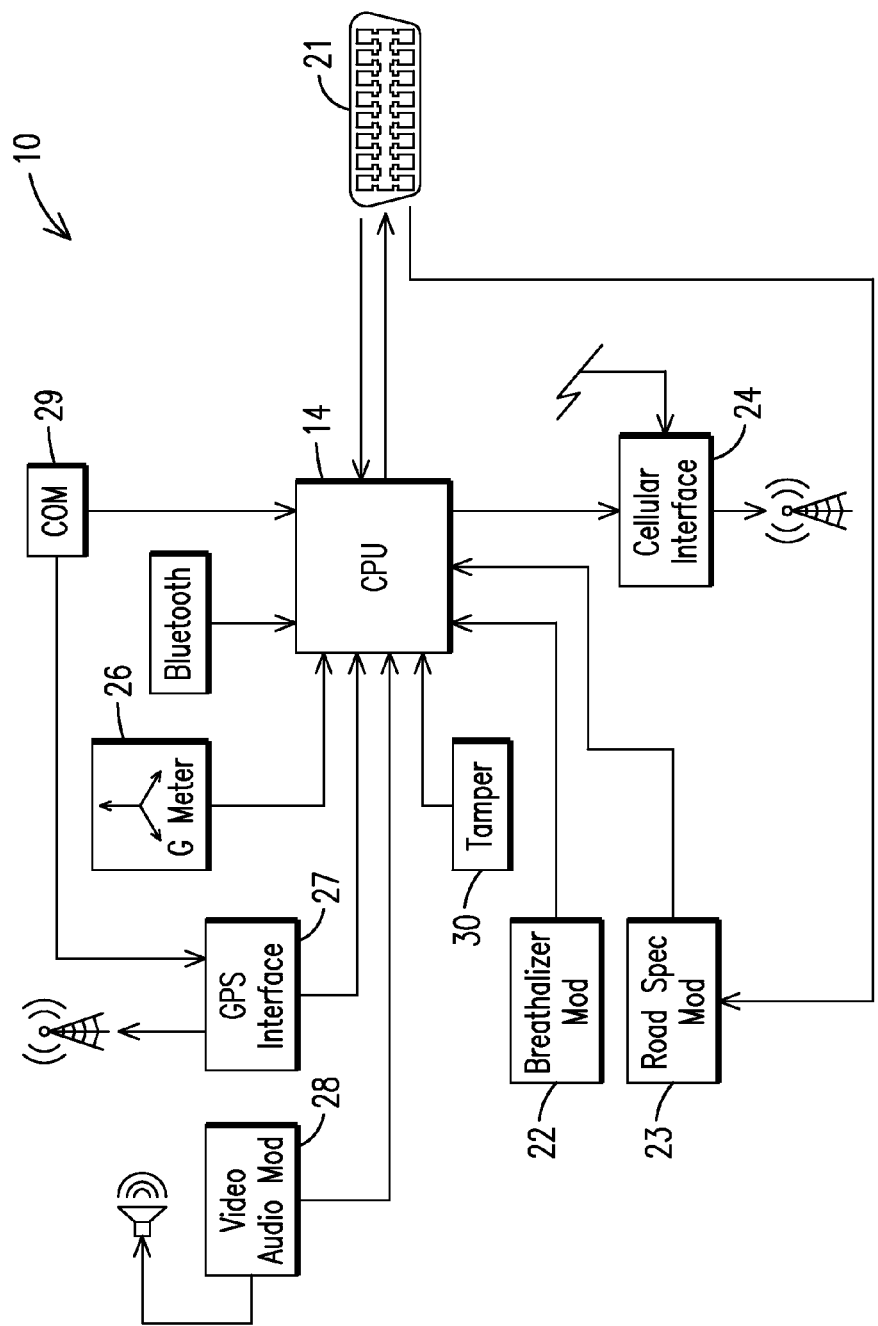
FIG. 2 is a diagrammatic view of a communication network interfaced with an OBD II connection.

Referring to FIGS. 1 and 2, a mobile communication system 10 uses additions to an automobile's CAN BUS network 11 to communicate between multiple transceiver micro controllers and their respective and discrete modules. The present mobile device may be added to the CAN BUS by connecting to the vehicle's on-board diagnostics (OBD-II) on board interface or connector or to future on board diagnostics systems used in vehicles utilizing SAE J1932-J1939 as well as ISO9141-2 standards for the OBDII interface for the present mobile communication system 10 which can remotely control speed, alert user, parents, guardians, corporate businesses, schools, taxis, lease, insurance, government, city and courts, administrations of excess speed, accidents, and locations. A video/audio data logger 12 records each event and stores recorded data via micro SD cards as well as memory in the safe driving system central processing unit and servers 13.

Each module i.e., audio, video, speed, GPS, angular G meter, cellular, Bluetooth, tolerance memory, and breathalyzer, works in real time and from data received on the same CAN BUS communication network communicating by way of integrated transceivers assigned to each module on the CAN BUS. The present mobile device contains a safe driving system central microprocessor 14 which acts as a "Traffic Cop" to direct and keep watch over data between each module of the safe driving system and its own dedicated CAN BUS micro transceiver. This central microprocessor is loaded with firmware/software that has been pre-loaded and determined by a developer and/or the end user.

The CAN bus communications network 11 can be seen in FIG. 1 as having inputs from a satellite and from a GPS Antenna 16 and a bluetooth antenna 17 and a laptop computer 18 and from a smartphone 20. These inputs, as seen in FIG. 2, are applied to the CPU 14 from the OBD II connection 21. The CPU then controls the Breathalyzer module 22 and the road specifications 23 to control maximum speed or other features of the vehicle. The CPU 14 has connections to a cellular interface 24 and controls the bluetooth 25 and the G meter 26. A GPS interface 27 is also coupled to the CPU as is a video/audio module 28. The CPU 14 has a tamper prevention module built in and connects to a Com communication port 31. A WIFI antenna 28 is also connected for wireless internet communications.

The road speed module 23 can be programmed with preloaded firmware which is set to send alarms to a recipient of oversight and/or to limit the speed as if a governor were in place. The present mobile device 30 can direct a stuck throttle and limit speed and can down the throttle position or shut fuel off as function of the firmware. This module would be on the CAN BUS network 31 which in turn is connected to its own CAN BUS micro transceiver that communicates road speed status with a high speed clock updating the CAN BUS controller to the safe driving system central microprocessor 14.

The safe driving system central microprocessor is connected to the transceiver CAN BUS controller microprocessor which communicates road speed parameters and uses pre-loaded firmware/software which is accessed by a library of allowable tolerances and has preloaded tolerance windows with which the present mobile device can operate within. Each module is polled on the CAN BUS network and each module has its own unique signature on the CAN BUS, which means all modules are awake and listening to the network and is receiving data at high clock speeds for maximum resolution on the OBD II network.

In the event the central microprocessor 14 receives a signal from the G-meter 32 that indicates that excessive G-force is or has been incurred over the limits that are pre-loaded into the tolerance comparator (preprogrammed limits stored in library of allowable limits) microprocessor, an alarm is sent via cellular interface to a recipient smart phone app, tablet or computer depending on how the SDS mobile device is programmed. The engine is shut off or operates at 35% power and if impact has occurred, an alarm is sent to an emergency recipient. The angular G-meter 33 is on the same network as the G-meter and detects excessive motion as well as impact data then a signal is sent to the CAN BUS transceiver microprocessor operating the embedded cellular modem which sends an alert to recipients.

The embedded GPS module 34 incorporates the same CAN BUS transceiver microprocessor configured to the GPS module on the present mobile CAN BUS network. The GPS module 34 communicates, speed, heading and location to the preprogrammed tolerance comparator which in turn can send alerts to a recipient as well as provide voice alerts over enabled loud speakers.

The audio/video module 36 incorporates its own dedicated CAN BUS transceiver microprocessor which operates on the same network as the other embedded modules, again the audio/video module has its own unique signal both send and receive over the CAN BUS network 31. Video data is recorded by way of the stereoscope digital camera 38 and that data is stored on a micro SD card for review at a later date. The Micro SD card is removable and upgradeable in capacity storage. Recording is triggered by optical proximity when the circuit tells the module to record in front and rear views. The camera 38 can read road speed limit signs and the audio/video module 36 can interpret the numerals. In addition, at a later date when road signs and speed limits are optically barcoded, the present mobile device will be able to read these types of signs as well as use RFID tags.

The tolerance comparator microprocessor 40 has a dedicated transceiver micro controller 41 which communicates with the CAN BUS and is always enabled and monitoring the BUS and comparing data stored in its memory via firmware/software determined by owner/developer. It is the comparator that sets limits, such as speed, location, video and G-meter/angular G-meter. The present mobile device is a software/firmware based system.

The present mobile device 30 operates with a transceiver controller on the network CAN BUS with the embedded Wi-Fi and blue tooth, the purpose of these two modules is for uploading and downloading of data, firmware as needed.

The central processor unit 14 has an external stand-alone reference module with a clock for recording the time and date of the system and is crystal controlled for accuracy.

The present mobile 30 device incorporates a TFT LCD display 43 that displays speed, location, incoming and outgoing cellular calls, alerts and has a tolerance that are preset with the operating systems tolerance comparator 40 and future apps to be determined.

The present mobile device 30 includes a Wi-Fi 46 antenna and a Bluetooth 47 antenna for pairing with other mobile devices. The system 30 also has an embedded microphone and speaker and incorporates a cellular antenna and a CDMA or GSM cellular modem with dedicated transceiver micro controller. There is an internal panic button which can be onboard the system or an option to be remotely controlled or hardwired.

Figure 3:
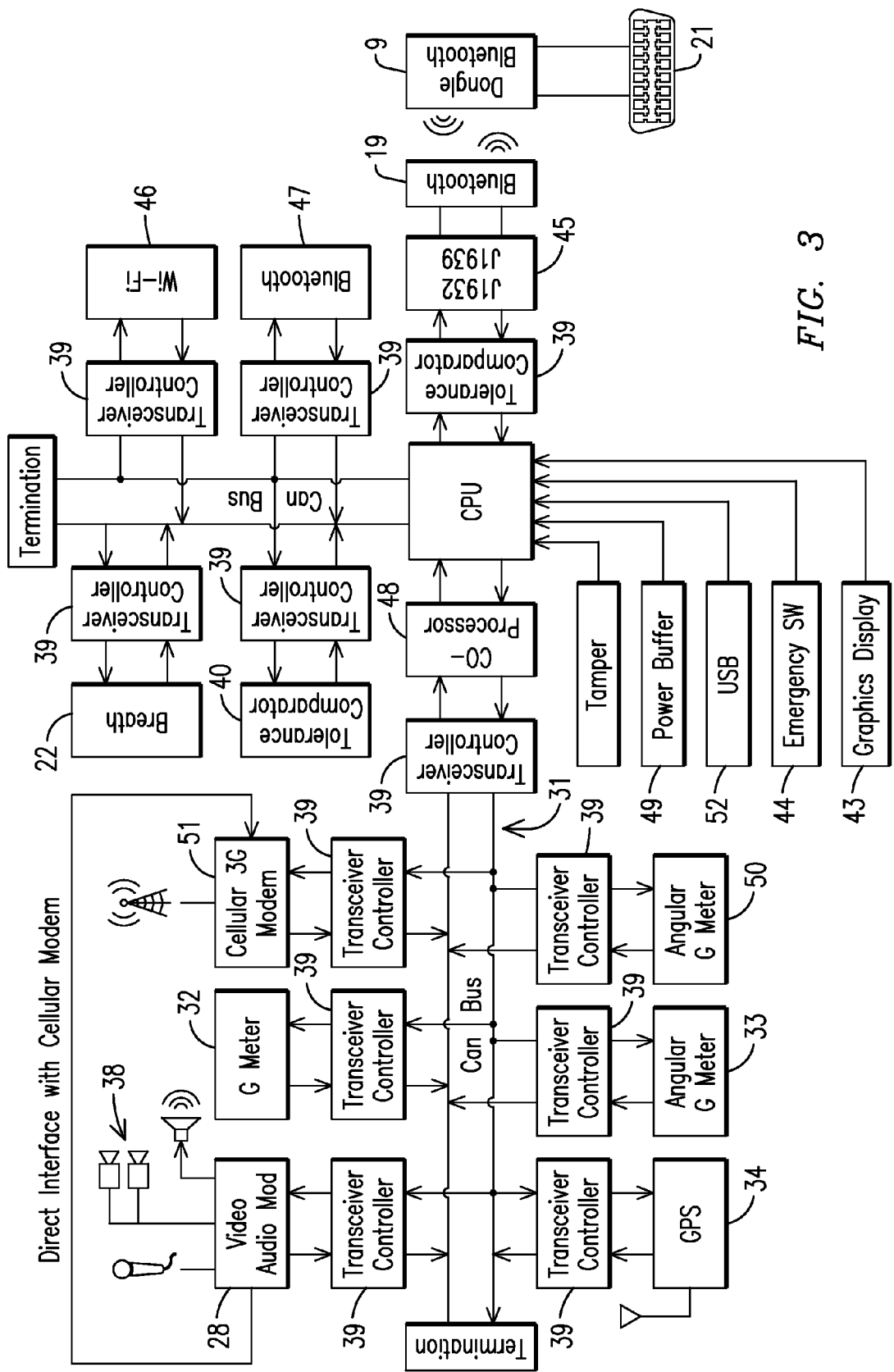
FIG. 3. is a block diagram of a communication system in accordance with the present invention having the CAN bus coupled to an OBD II connection.

Referring more specifically to FIG. 3, the Emergency Button (Panic Button) is provided to notify parents, guardians, businesses, an overseer, authorities and in case of other emergencies. The OBDII Interface 45 uses, USA, European and Asian Standards. The Graphics Display Module 43 is installed visually to notify user of conditions being monitored including the normal OBDII functions of the vehicle in use. This function is seen in real-time over the CAN BUS Network which is part of the normal operation of all modern vehicles. Both audible and visual alerts will be displayed on the system screen 43 if the vehicle has a malfunction or the vehicle exceeds preprogrammed limits set forth in the user defined operational limits. The CPU comparator library is a user defined library of acceptable limits of vehicle operation stored in the CPU 14. If those preset limits are exceeded based on user defined limits, the CPU then sends out alerts to respective parties and the vehicle that is in use. Operations can be monitored via an internal 4G phone modem. These alerts then can be sent to outside users of smart phones, computers or tablets. Vehicles then can be placed in a limp home mode if so desired or programmed into the SDS device.

A USB Port enables the SDS device to interfere with other mobile devices as well as computers for software exchange and or upgrades.

There are twelve (12) CAN BUS transceivers 39 in the system which allow the transceiver micro controller 14 to facilitate communications of each module over the CAN BUS network 31. The duplex exchange of data to and from each individual module in the present device is attached to its own individual transceiver which then allows the module to communicate over the CAN BUS network such as speed, GPS, G-Meter, Cellular Modem Audio, tolerance microprocessor, breath analyzer, Wi-Fi, Blue Tooth and OBDII vehicle interface, CAN BUS transceiver microprocessor NXP LPC Series.

The Wi-Fi Module 46 allows the system to have internal wireless communication. The Bluetooth Module 47 allows for other mobile devices to connect via bluetooth. The coprocessor 48 is used to supplement the functions of the primary CPU 14.

The Tolerance comparator library is a user defined library of acceptable limits of vehicle operation stored in the system's CPU. If those preset limits are exceeded based on user defined limits, the CPU then sends out alerts to respective parties and the vehicle that is in use. Operations can be monitored via an Internal 4G phone modem. These alerts then can be sent to outside users of smart phones, computers or tablets. Vehicles then can be placed in a limp home mode if so desired or programmed into the system.

A power buffer circuit 48 is used to reduce voltage spikes and transients that may occur in the system.

The mobile system 30 monitors the road speed of a vehicle via OBDII interface in the module 50. A preprogrammed speed limit is installed in the central micro processor and micro comparator to stay within preset limits. This system uses a stereoscopic camera 38 to see a visual display of posted speed limits preprogrammed use in conjunction with Google or similar maps. Over-speeding beyond limits preset in CPU will alert users, parents, guardians or overseers of excess limits. The mobile system will trigger a limp home feature if program is enabled. Other features can be programmed to reduce speed via fuel injection controls or throttle position once permitted by DOT.

The angular G-meter 33 (Centrifugal force meter) alerts the CAN BUS transceiver that the vehicle has rapidly veered off course or failed to properly negotiate a sharp curve in the road.

The Global Positioning Sensor 31 or GPS is installed in the system to identify and locate the vehicle and driver as well as their location. This feature can be used with the on-board 4-G modem when a signal is sent down the CAN BUS network. The cellular modem then notifies recipients on their smartphones, tablets or computers that an event has occurred.

The tolerance comparator microprocessor 40 is installed to monitor signals seen by the safe driving system Central microprocessor over the OBDII CAN BUS network and GPS system. The comparator monitors these signals based on what has been preprogrammed into the system to aide in limiting excesses such as speed or improper vehicle operation. Examples include reckless driving, accidents based on G-Meter programmed limits. The location of the vehicle based on oversight programming i.e. parental, corporate or other overseers preset limits of travel distance into the system. The vehicle can be slowed or placed in limp home mode and alerts sent to recipients, parent or overseers via the inter 4-G modem over the CAN BUS Network to smartphones, computers and tablets equipped with SDS firmware/software.

When the CPU identifies vehicle operations outside of the preprogramming limits, a signal is sent over the CAN BUS to the 4-G cellular modem 51 to alert other parties of improper vehicle operation or emergencies that arise. These alerts can be an accident or excessive speed out of limits of the tolerance comparator 41.

A breathe analyzer 22 is available as an option to prevent vehicle from operating if the driver is impaired. The breathe analyzer is enabled in the software. The system will prevent the vehicle from starting or operating in any way which would include an alert of tampering with the OBDII vehicle interface dx.

The G-meter 32 is installed and used to indicate angular condition of operation of a vehicle to indicate if the vehicle has been involved in an accident and in turn send signals to cameras, 4G modem and recording devices onboard the system as well as sending signals to alert recipients the vehicle is involved in an accident or being driven beyond preprogrammed acceptable limits. Recipients can monitor the system equipped vehicle via smartphone, tablet or computer.

The Audio/Video includes a pair of front viewing and rear viewing stereoscopic cameras 38 onboard the system vehicle to provide a panoramic view of the vehicle's surroundings and a recording of the views and starts in the event of a collision or another vehicle or object enters a preprogrammed space or distance as set forth in the system preprogrammed limits. The recording is stored in a micro SD card in the SDS device and if enabled, the system can provide streaming video to the onboard 4G modem to a smartphone, tablet or computer. Recordings begin when the preprogrammed limits of distance or space has been breached.

Figure 4:
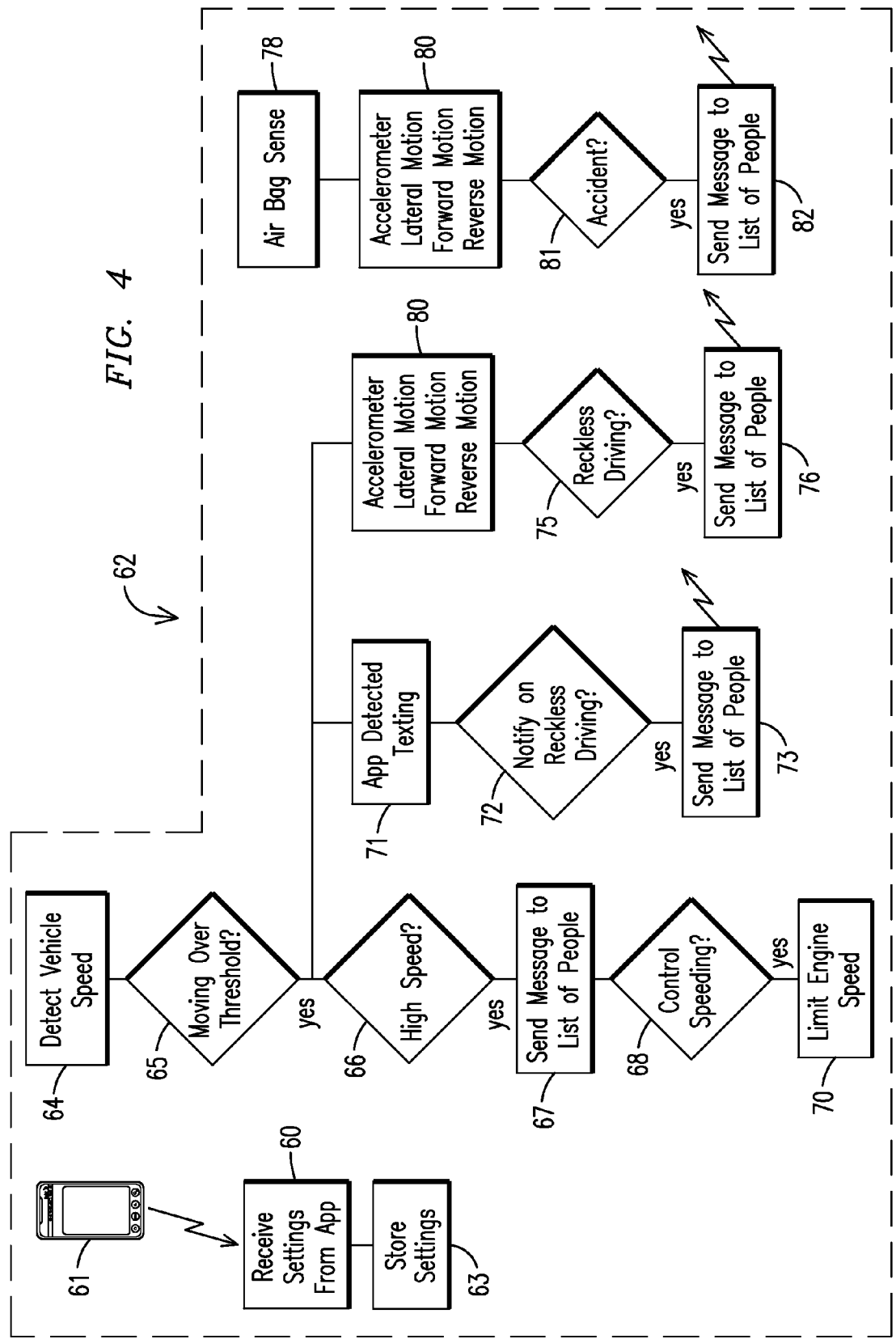
FIG. 4 is a block diagram of the firmware for the present invention.

FIG. 4 of drawing is a firmware block diagram of the present invention. The firmware receives settings 60 from an App on a wireless communication device 61, such as a smart phone or computer tablet. The App on a phone may send new settings to the safe driving system (SDS) 62 at any time. When new settings are received they are stored (61) in nonvolatile memory on the SDS. The system detects the vehicle speed (64) and determines if the speed is over the set threshold value (65). The section starting with this block executes over-and-over. It starts by detecting the vehicle speed and if the speed is over the set threshold, which may be determined by the tolerance controller and comparator (see FIG. 3). When the vehicle is moving faster than a set threshold, such as 5 MPH over the speed limit, the other blocks will execute. If the vehicle is moving faster than the speed limit by a preset margin and a high speed (66) is determined, a "yes" is sent to the a smart phone 61 or to a list of smart phones. If the decision is "no", the vehicle speed is checked again on continuous basis. The speed limit for every road is stored in the device or in a remote database or is determined by visual means from posted speed limits on the highway or road the vehicle is traveling and its position is determined by the GPS system. If the High Speed decision (66) is "yes", a message is sent to a list of people and by means specified in the settings. Messages (67) may be sent by a short message system (SMS) message, email, or a phone call.

If a high speed decision (66) is "yes", the engine speed is controlled (68) and limits the engine speed 70 by sending an OBDII message to the engine. If the decision is "no", the vehicle's speed is checked again. If the vehicle is moving over the small set threshold, such as 5 MPH, the App detects (71) whether texting or other use of the phone has been reported by the App on the driver's phone. If speeding has been detected above the set tolerance, a notification of reckless driving 72 is sent by messages (73) to a list of people advising of the reckless driving.

If the vehicle is moving over the tolerance threshold, reading of the accelerometer 74 determines lateral motion, forward motion and reverse motion to determine if thresholds stored in the setting is being exceeded and a determination of reckless driving (75) can be determined. Reading above the thresholds indicates reckless driving, and messages are sent (76) to a list of people by SMS message or email or phone.

The GPS Position is transmitted every minute to continuously keep track of the vehicle's position. In case the air bag is actuated or the accelerometer determines an accident (81), a message (82) is sent to a list of people reporting the accident. Reading are taken from the accelerometer any time the vehicle is moving over the tolerance threshold of the speed limit. If an accident determines a "yes", messages are sent by SMS message, email, or a phone call.

There are three different versions of the App used in the present invention and all use the safe driving system (SDS). A Driver App allows the driver to get alerts from the SDS with the vehicle and to display a message to the driver of speeding, reckless driving or of an accident and also can detect texting or unsafe use of a smart phone in the vehicle. The phone's App looks for any usage of the buttons on the phone. An optional setting for the App may include disabling of the phone when texting or unsafe usage is detected. The phone will remain disabled so no more unsafe usage can take place until the Customer App is used to enable it. If the phone is not disabled, then the App on other phones are sent a message that texting or unsafe usage is taking place. Only the Customer's App can be used to set settings on the SDS. Setting on the Customer's App can be sent to the SDS which are received by the Received Settings from App 60 of FIG. 4.

It should be clear at this time that a mobile communication system which interfaces with a vehicle's OBD II CAN BUS network to communicate between multiple transceiver micro controllers and their respective and discrete modules has been illustrated but it will be clear that the present safe driving system will work equally well with future technology, such as a new OBD standard. However, the present invention is not to be considered limited to the forms shown which is to be considered illustrative rather than restrictive.

I claim:

1. A vehicle control system for monitoring and executing a control command remotely comprising:
    a vehicle having a CAN BUS communications network;
    a safe driving system central microprocessor operatively connected to said CAN BUS communication network, and to a Global Positioning System and to an accelerometer;
    a tolerance comparator microprocessor coupled to said safe driving system central microprocessor and having a library of user defined acceptable limits of vehicle operation, said tolerance comparator microprocessor being coupled to a speed limit determining means for determining the speed limit at the location of said vehicle to thereby determine a safe driving speed for said vehicle;
    a transceiver for communicating data from said safe driving system central microprocessor; and
    a remote wireless communication device for receiving data transmitted from said transceiver, said wireless communication device having an applet for remotely executing a control command to said safe driving system central microprocessor for remotely controlling the operation of said vehicle responsive to data received from said safe driving system central microprocessor;
    whereby a vehicle's operation can be monitored and a vehicle control command executed remotely from a wireless communication device.

2. A method of remotely monitoring and executing control commands in a vehicle comprising the steps of:
    attaching a safe driving system central microprocessor to a CAN BUS communication network of a vehicle, and to a Global Positioning System and to an accelerometer;
    coupling a tolerance comparator microprocessor to said safe driving system microprocessor, said tolerance comparator microprocessor having a library of user defined acceptable limits of vehicle operation;
    continuously measuring the speed of said vehicle having said attached safe driving system central microprocessor;
    continuously monitoring the speed limit of the vehicle having the safe driving system central processor at the vehicle's location;
    determining when a vehicle's speed exceeds a tolerance set by the tolerance comparator microprocessor from the library of user defined acceptable limits of vehicle operation;
    transmitting a vehicle's speed exceeding a set tolerance to a remote wireless communication device; and
    transmitting a vehicle control command from said remote wireless communication device to said central processor;
    whereby a vehicle's operation can be monitored and a control command executed remotely from a wireless communication device.

3. The vehicle control system in accordance with claim 1 in which the speed limit determining means determines the speed limit of the position of the vehicle by reading a database of speed limits.

4. The vehicle control system in accordance with claim 3 in which said database of speed limits is located remote from said vehicle.

5. The vehicle control system in accordance with claim 1 in which the said vehicle has a camera thereon and in which the speed limit determining means determines the speed limit of the position of the vehicle by the camera visually reading posted speed limits.

6. The vehicle control system in accordance with claim 1 in which said safe driving system central microprocessor is operatively connected to said CAN BUS communication network through an OBD-II connector.

7. The vehicle control system in accordance with claim 1 in which said remote wireless communication device is a smart phone.

8. The vehicle control system in accordance with claim 1 in which said vehicle control system incorporates blue tooth communications for pairing with a vehicle on-board remote wireless communication device whereby a vehicle operator can monitor his driving.

9. The vehicle control system in accordance with claim 1 has means for detecting texting on a wireless communication device in said vehicle and notifying said remote wireless communication device.

10. The vehicle control system in accordance with claim 1 in which said vehicle control system central microprocessor detects accelerometer readings and determines potential reckless driving of said vehicle and communicates the determination to said remote wireless communication device.

11. The method of remotely monitoring and executing control commands in a vehicle in accordance with claim 2 including the step of determining the speed limit by searching a database of speed limits for the speed limit at the position of the vehicle.

12. The method of remotely monitoring and executing control commands in a vehicle in accordance with claim 11 including the step of determining the speed limit by searching a database located remotely from said vehicle.

13. The method of remotely monitoring and executing control commands in a vehicle in accordance with claim 11 including the step of reading the speed limit on road signage with a camera on said vehicle.

14. The method of remotely monitoring and executing control commands in a vehicle in accordance with claim 2 including the step of attaching the safe driving system central microprocessor to the CAN BUS communication network by coupling to the OBD-II connector of a vehicle.

15. The method of remotely monitoring and executing control commands in a vehicle in accordance with claim 2 including the step of transmitting the vehicle's speed exceeding a set tolerance to a remote smart phone.

16. The method of remotely monitoring and executing control commands in a vehicle in accordance with claim 2 including the step of pairing a blue tooth connection between said CAN BUS and a vehicle on-board wireless communication device.

17. The method of remotely monitoring and executing control commands in a vehicle in accordance with claim 2 including the step of detecting an operator of said vehicle texting while driving and communicating the detection to said wireless communication device.

18. The method of remotely monitoring and executing control commands in a vehicle in accordance with claim 2 including the step of detecting accelerometer readings of said vehicle and determining potential reckless driving therefrom and communicating the determination of potential reckless driving to said remote wireless communication device.

* * * * *